United States Patent [19]

Santarelli

[11] 4,128,986

[45] Dec. 12, 1978

[54] APPARATUS PARTICULARLY FOR THE AUTOMATIC HARVESTING OF FRUIT

[75] Inventor: Mario Santarelli, Livorno, Italy

[73] Assignee: Harvester Center Italiana S.r.l., Piazzetta Guastalla, Italy

[21] Appl. No.: 772,175

[22] Filed: Feb. 25, 1977

[30] Foreign Application Priority Data

Mar. 29, 1976 [IT] Italy .............................. 21685 A/76
Apr. 30, 1976 [IT] Italy .............................. 22859 A/76

[51] Int. Cl.² ............................................. A01D 46/00
[52] U.S. Cl. ................................. 56/328 TS; 294/104
[58] Field of Search ............... 56/328 TS; 294/103 R, 294/104

[56] References Cited

U.S. PATENT DOCUMENTS

| | | | |
|---|---|---|---|
| 3,121,304 | 2/1964 | Herbst | 56/328 TS |
| 3,318,629 | 5/1967 | Brandt, Jr. | 294/103 |
| 3,460,329 | 8/1969 | Overstreet, Jr. | 56/328 TS |
| 3,504,486 | 4/1970 | Fridley | 56/329 TS |

Primary Examiner—Louis G. Mancene
Assistant Examiner—Daniel J. Leach
Attorney, Agent, or Firm—Guido Modiano; Albert Josif

[57] ABSTRACT

Apparatus for automatic harvesting of fruit such as olives, nuts, almonds and/or the like, including a vibrating device provided with a pair of driven wheels with eccentric masses and driving pulleys adapted to rotate independently the wheels. The pulleys are actuated by means of a pair of substantially vertically opposed hydraulic motors fixed to the frame of the apparatus. The pulleys cooperate operatively with said driven wheels to produce vibrations of a frequency variable through an angle of substantially 360°. Fixing articulated means for the jaw members act to tighten and shake the trunk of a tree and provide an autocentering couple. A catching member is associated to the jaws.

10 Claims, 19 Drawing Figures

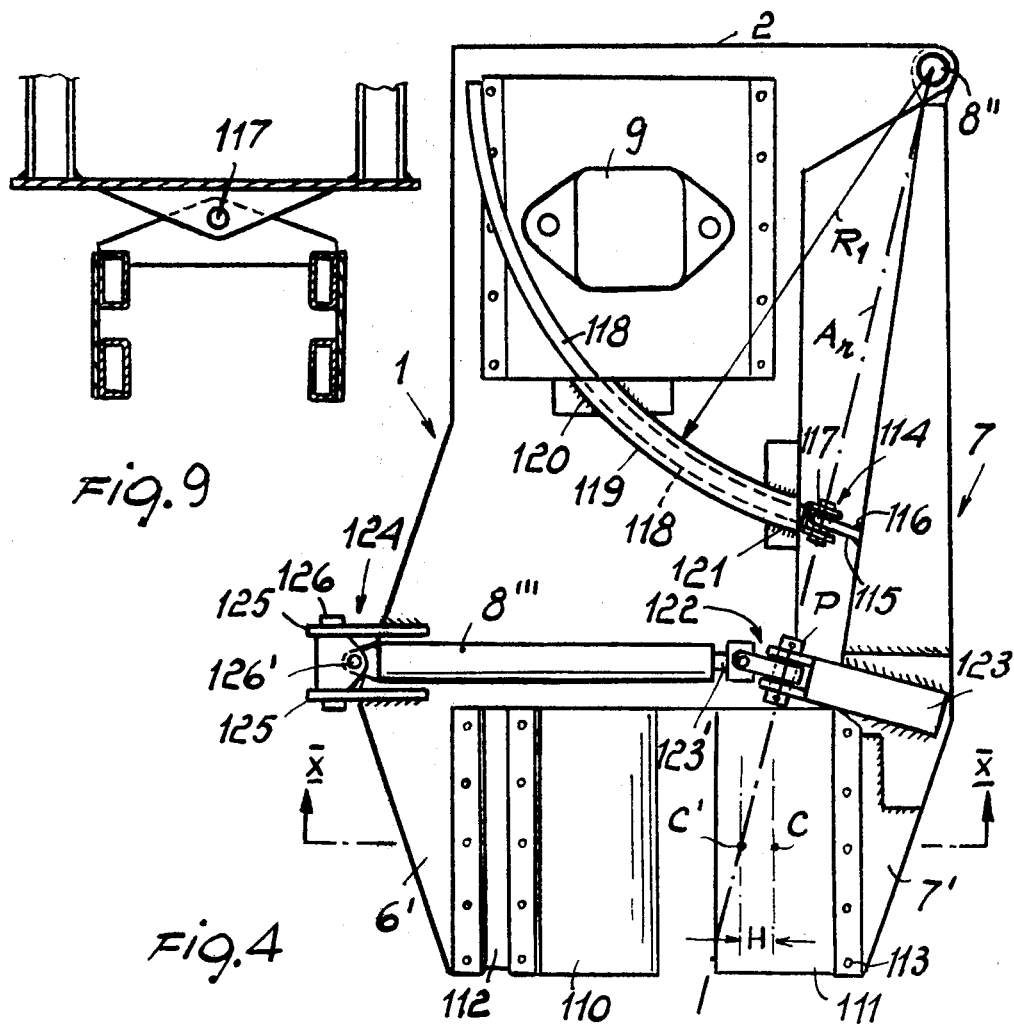
Fig. 9
Fig. 4
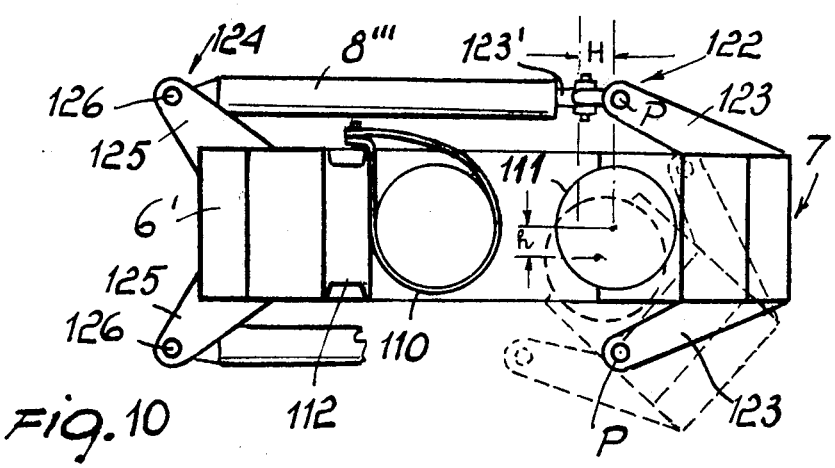
Fig. 10

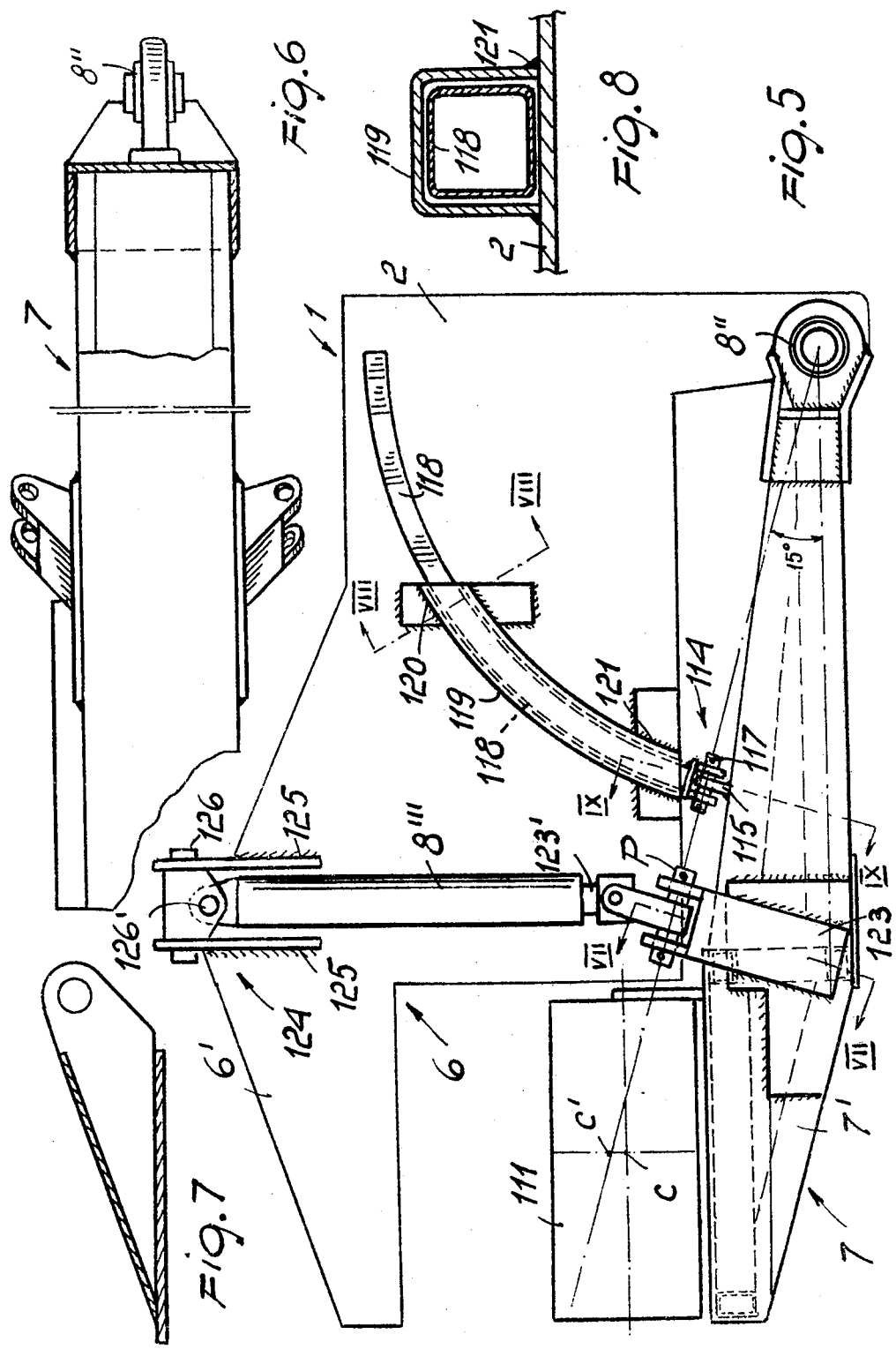

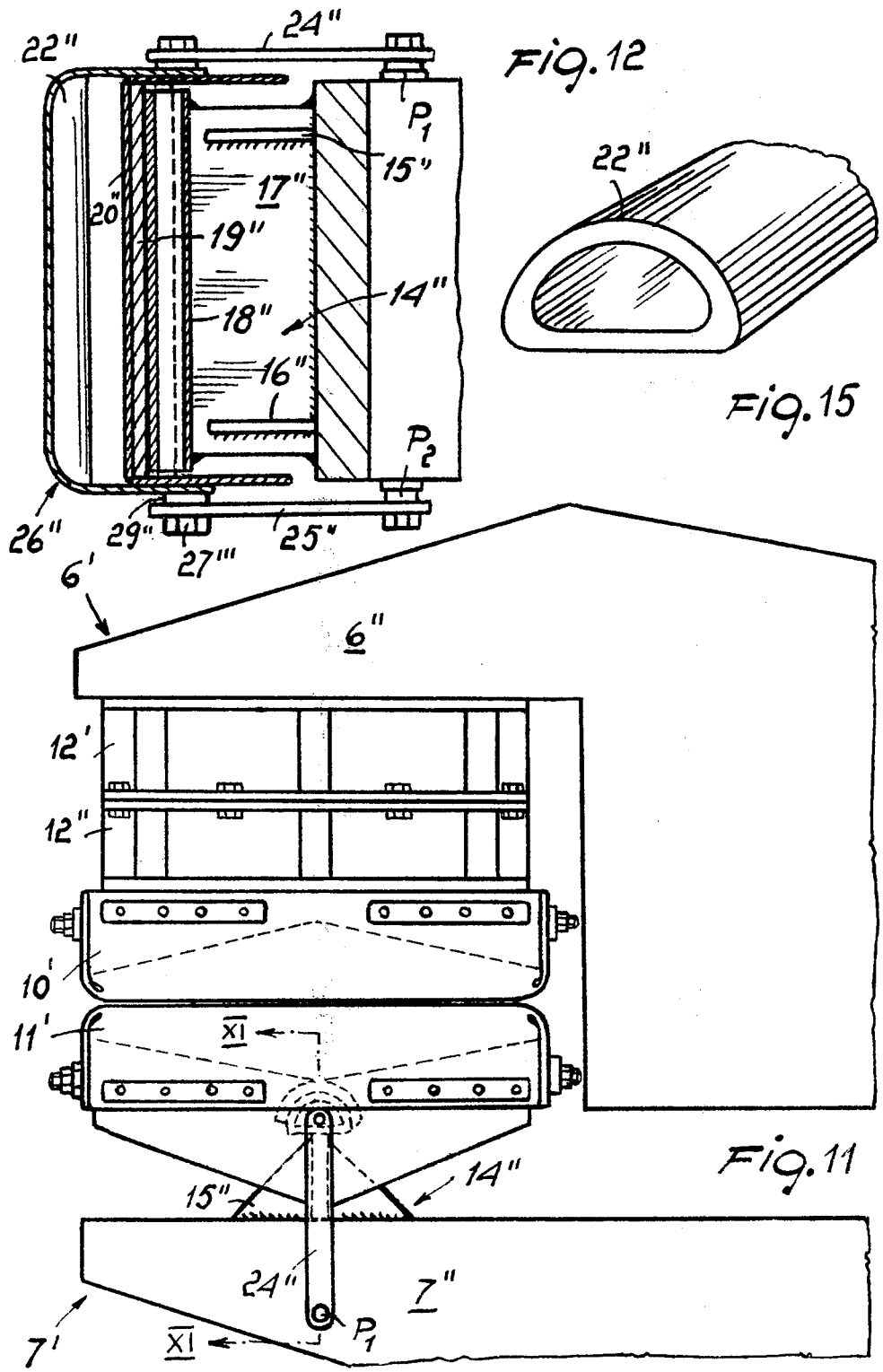

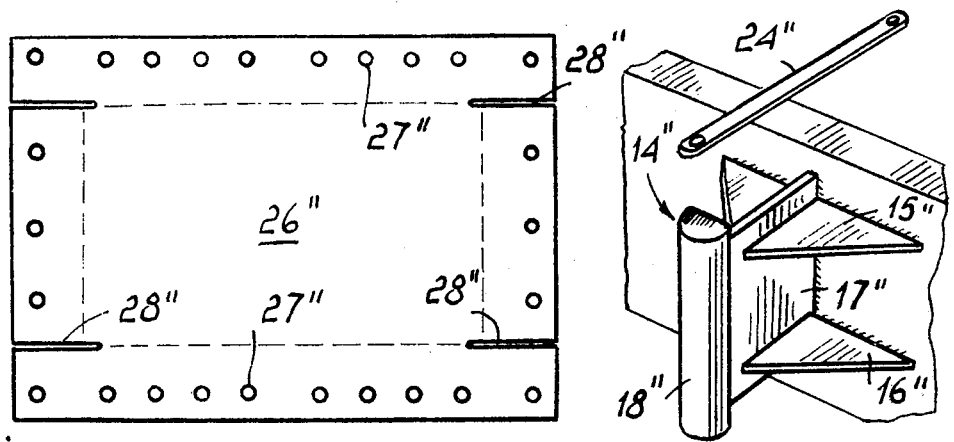
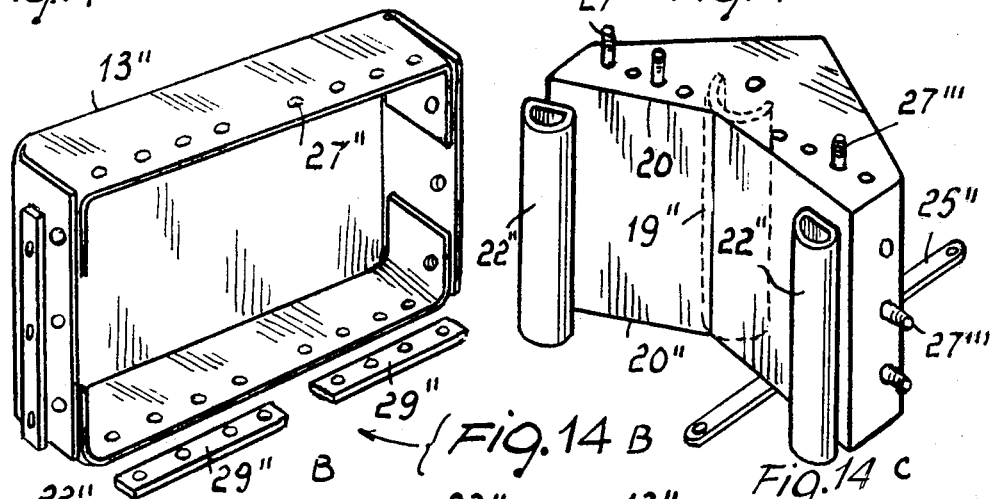
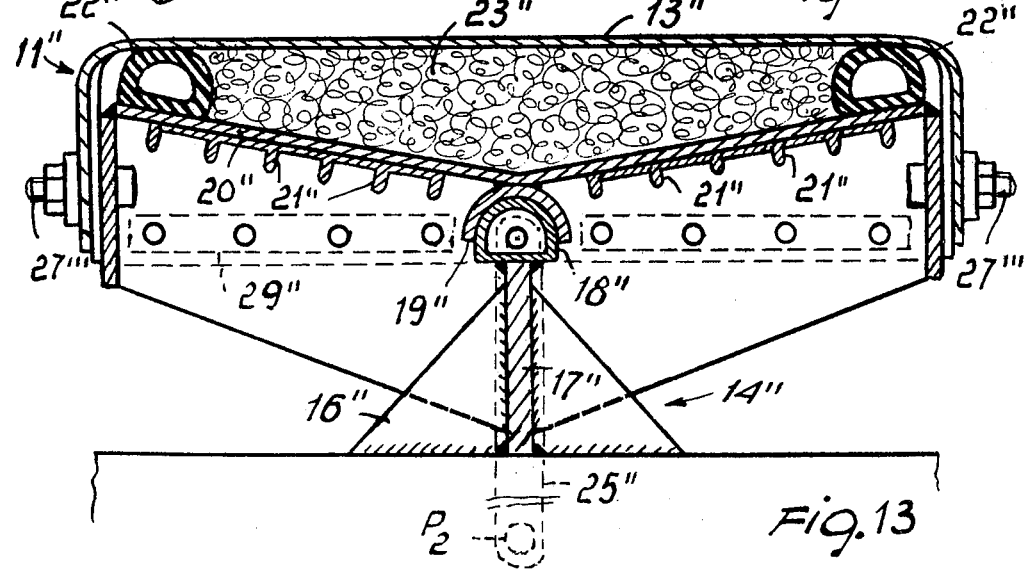

APPARATUS PARTICULARLY FOR THE AUTOMATIC HARVESTING OF FRUIT

BACKGROUND OF THE INVENTION

The present invention relates to an apparatus for the automatic harvesting of fruit such as olives, nuts, almonds and/or the like.

Today, due to obvious economical reasons, the harvesting of fruit, and particularly of olives, is carried out mechanically by means of apparatuses which, based on the tree shaking method, may generally classified into two principal types. The first and more conventional one comprises a device which shakes the branches to detach the fruit therefrom, by means of unidirectional reciprocating movements. This shaking method may often cause damages to the tree and moreover it is not able to provide a high harvesting efficiency.

The second type of apparatus comprises a vibrating device which, after catching the tree or branches thereof, by means of jaw members, transmits the power of a motor to the tree by means of repeated vibrations having a high-value fixed frequency (for example, 4000 cycles per minute). In this manner very small shock waves are successively produced which generate a high frequency pulsation the direction of which changes continuously through a 360° arc, said vibration increasing from the largest branches to the smallest ones. Therefore, the fruit detaches due to composite effects caused by resonance and by such residual torsional couples which concentrate prevailingly onto the fruit stem, the possibility of damaging the tree being in this manner greatly reduced.

However, even the known apparatuses of the vibration type are not completely satisfactory principally due to the impossibility of varying during operation not only the vibration frequency of the vibrating device but also other parameters of the vibration. Moreover, in the known apparatuses of the vibration type for harvesting fruit, the mechanism for the closing and/or opening operations of the jaw or catching members of the vibrating device presents some disadvantages in that its operation requires generally a high power and further introduces excessive stresses to structural elements of said vibrating device, which often cause the arms, catching jaws or carrying structure to break.

SUMMARY OF THE INVENTION

Due to the aforesaid drawbacks of the known apparatuses of the vibration type for the automatic harvesting of fruit, a primary object of the present invention is to provide an apparatus for automatically harvesting fruit comprising a vibrating device in which not only the vibration frequency may be varied during operation but also other parameters of the vibration, so as to optimize the dynamic effect of detaching fruit from trees of any size and then optimize the harvesting efficiency.

Another object is to provide such an apparatus comprising a vibration device including an improved mechanism for closing and/or opening the catching jaw members of said device, which mechanism requires for the operation thereof a minimal power while allowing for a safe catching of the tree without damaging said tree.

Another object is to build the apparatus frame and the members for fixing and carrying the movable jaw member in such a manner that, with the apparatus in operation, the stresses concentrated therein are statically determined.

Another object of the present invention is to improve the catching effect of the jaw members onto trees of any diameter and size by building the members for fixing and/or carrying the movable jaw and the hydraulic cylinder-piston assemblies for operating said movable jaw, in such a manner that, when said movable jaw is brought to its closing and catching position, a self-centering and self-tightening effect of the two jaws onto the trunk tree occurs.

Aother object is to shape the jaw members or arms of said apparatus so as to assure an automatic aligning of the two jaw tightening sides and then a particularly good catching of the trunk both with respect to the static load distribution and the vibratory kinetic energy transmission.

Another object of the present invention is to shape said jaw members or arms so as to automatically prevent said catching if the apparatus is located erroneously with respect to the tree.

Another object of the present invention is to provide catching members adapted to be movably associated to the jaws of an apparatus for automatically harvesting fruit which, in any operation condition, have a quite good tree-contacting surface.

Another object of the present invention is to provide catching members adaptable to trees of any shape while being structurally simpler and more economical than the roll members which are today used in a great number of apparatuses for automatically harvesting fruit.

Another object of the present invention is to provide such catching members requesting a minimum of maintenance and with a service life greater than that of the roll members today used in the apparatuses for automatically harvesting fruit.

The aforesaid and other objects, which will become more apparent thereinafter, are achieved by an apparatus for automatically harvesting fruit comprising a vibrating device, said device including a substantially rigid frame carrying a first shaft, onto said first shaft being rotatably supported a driven wheel pair, said wheels being adapted to independently rotate about said first shaft and with eccentric masses movably associated thereto, characterized in that said device comprises independently operating first and second motor means movably fixed to said rigid frame and having a second and third shafts respectively, onto said second shaft being keyed a first driving pulley adapted to rotate with a first speed and into a first direction, by a first belt connection, a wheel of said driven wheel pair, and onto said third shaft being keyed a second driving pulley adapted to rotate with a second speed and into a second direction opposed to said first direction, by a second belt connection, the other driven wheel of said pair, said first and second driving pulleys operatively cooperating with the driven wheels of said pair to produce vibrations of a frequency varying through an angle of substantially 360°.

BRIEF DESCRIPTION OF THE DRAWINGS

The invention will be better understood from the following detailed description of its exemplifying embodiments illustrated in a non limitative sense in the accompanying drawings in which:

FIG. 4 is a plan schematic view of a side of another preferred embodiment of the apparatus for automatically harvesting fruit according to the present invention;

FIG. 5 is a plan schematic view, portions being omitted, of the other side of the apparatus of the invention;

FIG. 6 is a partial schematic view of the swingable jaw member;

FIG. 7 is a partial sectional view as taken through line VII—VII of FIG. 5;

FIG. 8 is a section view taken through line VIII—VIII of FIG. 5;

FIG. 9 is a sectional view taken through line IX—IX of FIG. 5;

FIG. 10 is a schematic sectional view taken through line X—X of FIG. 4, the dashed lines of said view showing the movable swingable jaw member in a "turned" position;

FIG. 11 is a schematic view of the jaw members of another preferred embodiment of the apparatus for automatically harvesting fruit of the present invention with the resiliently deformable catching members according to the present invention;

FIG. 12 is a sectional view taken through line XI—XI of FIG. 11;

FIG. 13 is a more detailed schematic view of one of the resiliently deformable catching members according to the invention;

FIGS. 14A-D schematically illustrate a preferred method for making the resiliently deformable catching member shown in FIG. 13;

FIG. 15 is a schematic perspective view of a structural member used for making the resiliently deformable catching members of the present invention.

DESCRIPTION OF THE PREFERRED EMBODIMENTS

Figure 1:
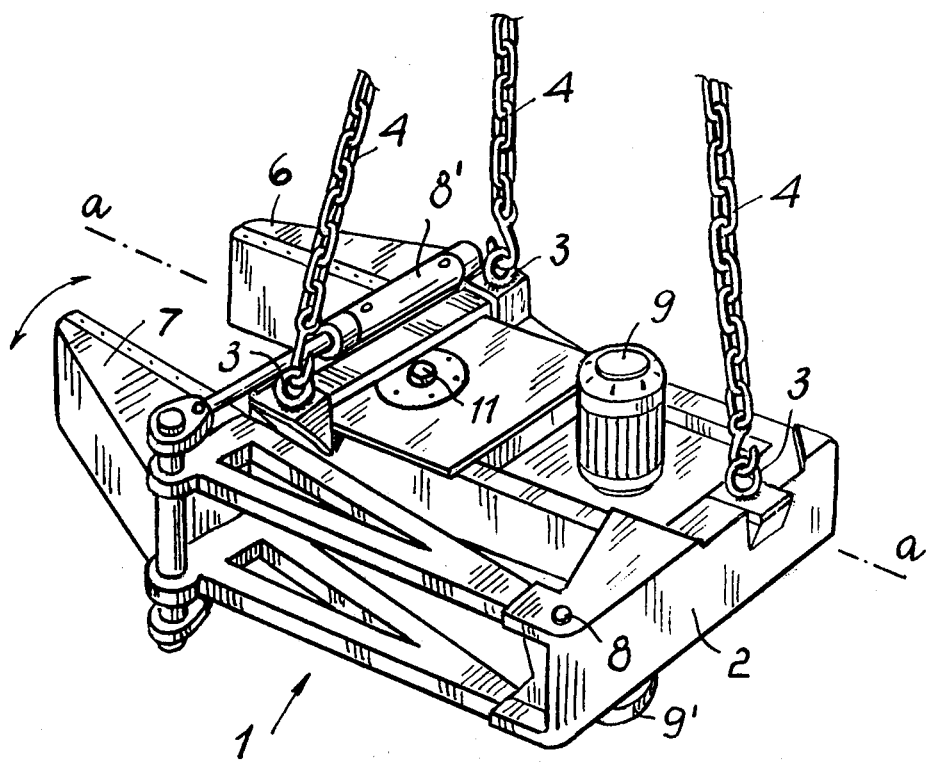
FIG. 1 is a perspective view of the apparatus for automatically harvesting fruit according to the present invention.
Figure 2:
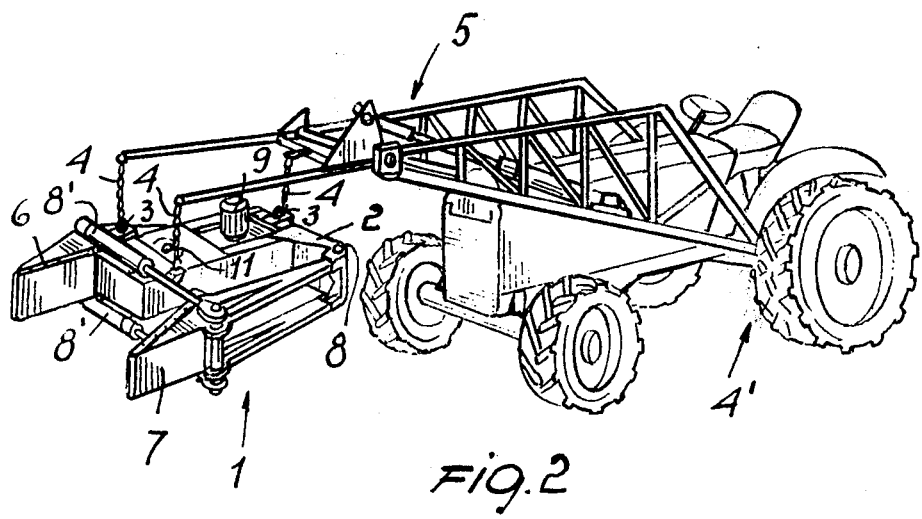
FIG. 2 is another perspective view of the apparatus of FIG. 1 mounted onto a tractor in an operating position.

Referring now to the drawings, and more specifically to FIG. 1, the vibrating device 1 according to the invention is herein illustrated perspectively. As shown, the device 1 comprises a substantially rigid frame 2 having fixing points 3 for chains 4 by means of which the vibrating device 1 may be lifted by a tractor 4', by means of an arm 5 thereof, to be brought into an operating position. The vibrating device 1 is provided with a first jaw member 6 rigid with the frame 2 and a second jaw member 7 pivoted at 8 to the frame 2 and swingable from an opening position to a closing and/or catching position with respect to the first jaw member 6. This closing and opening movement is achieved by means of two hydraulic cylinder-and-piston members 8', only the upper one of which being shown in FIG. 1, the lower one being in a substantially opposed position, below the lower horizontal side of the frame 2 (FIG. 2). As shown the cooperating upper and lower cylinder-and-piston members 8', are located, according to the present invention, substantially perpendicular to the longitudinal axis a—a of the frame 2. In this manner the opening and closing movements of the jaw member 7 with respect to the jaw member 6 may be carried out by a minimum of power without excessively stressing the supporting portions of the device 1. This is a specific characteristic of the present invention and it represents a substantial improvement with respect to the known vibrating devices, the opening and closing driving mechanisms of which generally employ diagonal rods sliding on the upper plane of the device frame and requesting for their operation high powers with consequent high stresses on the device. Still referring to FIG. 1, the hydraulic vibration producing motor 9 is shown, which is removably supported onto the frame 2 and receives hydraulic fluid through a suitable hydraulic circuit (not shown). It is to be noted that, according to the teachings of the present invention, a second hydraulic vibration producing motor 9' (FIG. 3) is located at a substantially opposed position onto the other horizontal lower side of the frame 2, said motor 9' receiving hydraulic fluid from a separated second hydraulic circuit (not shown), said two hydraulic motors 9, 9' operatively cooperating to produce variable-frequency vibrations, as it will be more apparent from FIG. 3.

Figure 3:
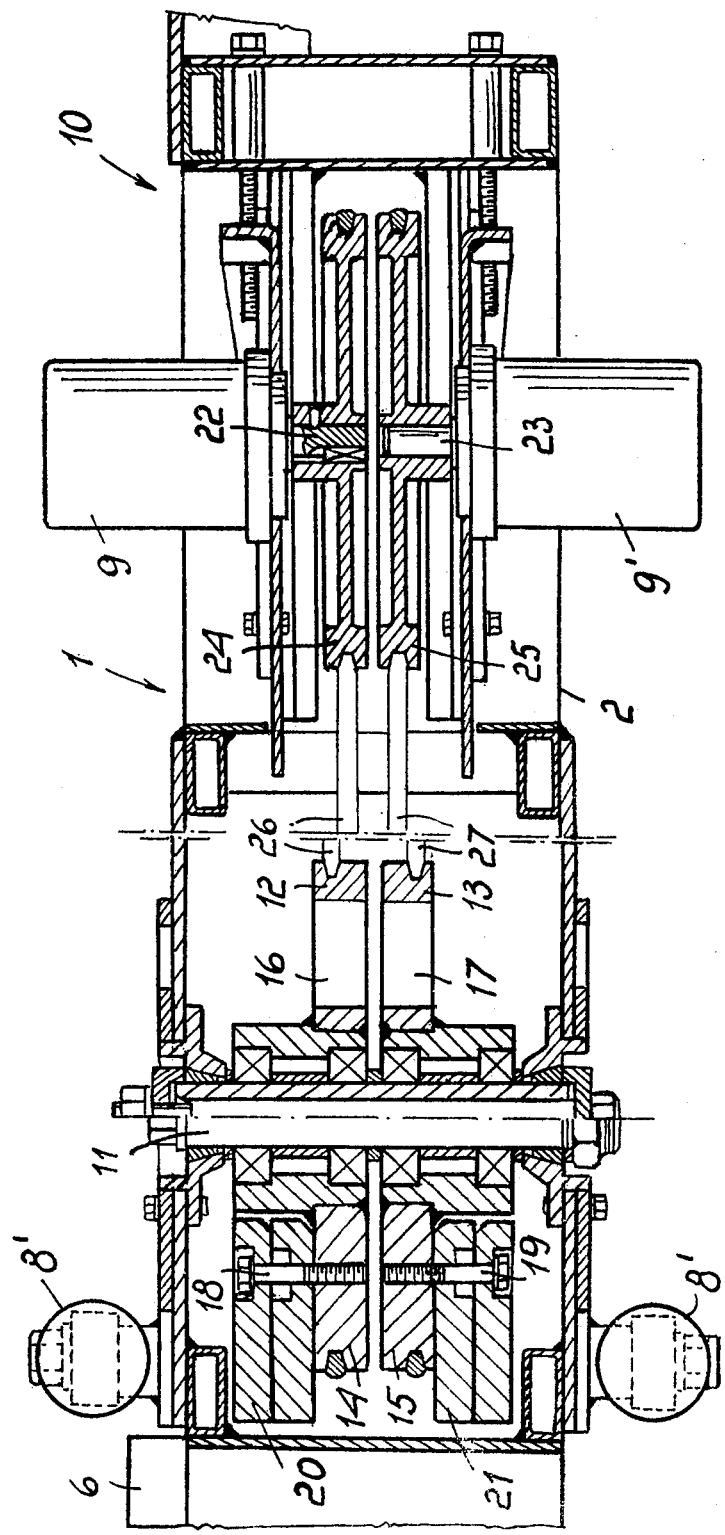
FIG. 3 is a schematic view of the mechanism for producing vibrations as applied to the apparatus according to the present invention.

Referring now to FIG. 3, the vibration producing mechanism 10 according to the invention is herein schematically shown. The mechanism 10 comprises, movably fixed to the frame 2, a first shaft 11, on which two driven wheels 12, 13 are rotatably supported respectively, said wheels including land portions 14 and 15 and "hollow" portions 16 and 17 respectively. Eccentric masses, e.g. 20, 21, may be movably associated to the wheels 12, 13, for example, by bolts 18, 19. Movably fixed to the frame 2 by known fixing means there are the vibration producing motors 9 and 9', which, as it is shown, are mounted at substantially vertically opposed positions. In the preferred embodiment the motors 9, 9' are two hydraulic motors receiving hydraulic fluid from two separated hydraulic circuits (not shown). The motors 9, 9' have two shafts 22, 23 respectively on which driving pulleys 24, 25 are keyed. The pulley 24 is connected through the V-belt 26 to the driven wheel 12 while the pulley 25 is connected through the V-belt 27 to the driven wheel 13. As shown, both the pulleys 24, 25 and the driven wheels 12, 13 may respectively rotate independently. More specifically, the driving pulley 24 rotates the driven wheel 12 with a speed and a direction different from those with which the driving pulley 25 rotates the driven wheel 13. In this manner, owing to the particular arrangement of the eccentric masses or counterweights onto the driven wheels 12, 13 and to the particular configuration thereof, vibrations are created which through the closed jaws 6, 7, will be transmitted to the tree and/or branch. It is to be noted that the removable mounting, e.g. of the driving pulleys 24, 25, allows for a changing of these pulleys, so as to change the angular speed ratios thereof. Also the belts 26, 27 may be replaced so as to change, according to a number of transmission ratios, the tip speeds of the driven wheels 12, 13. Owing to the illustrated arrangement, those skilled in the art will easily understand that, from the teachings of the invention, it is possible, during the operation of the vibrating device, by opening and closing distributing means (not shown) in the aforesaid separated hydraulic circuits, to change the mutual angular speed ratio between the two driven wheels. Thereby it is possible to obtain vibrations the frequency of which is variable during operation substantially through an arc of 360°.

Referring now to FIGS. 4–10 of the drawings, another preferred embodiment of apparatus for automatically harvesting fruit according to the invention is herein schematically illustrated. The apparatus 1 comprises a first jaw member 6' rigid with the frame 2 and a second jaw member 7' swingable from an opening position to a closing and/or catching position with respect to said first jaw member 6'. In the previously described embodiment the jaw member 7' was pivoted to the frame 2 and therefore it could carry out movements only in one plane. This pivot fixing of the jaw member 7' caused the drawback consisting in the occurrence of concentrated stresses at not-statically determined points which in turn caused the jaw member 7' or other structural portions of the apparatus 1 to break. In this embodiment the jaw member 7' is on the contrary removably associated to the frame 2 by means of an articulated or ball joint 8", of known type, which allows for the jaw member 7' to carry out movements in substantially any directions. The opening and closing movement of the jaw member 7' is achieved by two hydraulic cylinder-and-piston members 8''' which, as before, are located substantially opposed to one another, one of said members being on the upper horizontal side of the frame 2 and the other on the lower horizontal side of said frame 2. In FIG. 4, the hydraulic vibration producing motor 9 is moreover schematically shown, as supported removably onto the frame 2, said hydraulic motor receiving hydraulic fluid through a suitable hydraulic circuit (not shown). At a substantially opposed position, on the other horizontal side of the frame 2 a second hydraulic vibration producing motor (not shown) is located, which receives hydraulic fluid from a second separated hydraulic circuit (not shown), said two hydraulic motors 9 operatively cooperating to produce variable-frequency vibrations in the manner which has been characteristically described above. Referring still to the aforesaid Figures, to the jaws 6', 7', catching or clamping rollers 110, 111 are removably secured, said rollers being for example made of a material having such an elasticity adapted to allow for the deformation of the rollers 110, 111 when the jaw 7' is closed to tighten against the trunk of a tree. As shown, the rollers 110, 111 are removably associated to their respective jaws 6', 7' by means of plates 112, 113 respectively which can be easily removed to allow for the fitting of the rollers 110, 111 to trunks of different diameters. The fixing and/or supporting mechanism for the movable arm will now be described, said mechanism being specific to this embodiment. As particularly shown in FIGS. 4 and 5, one end of the swingable or movable arm 7 is fixed to the frame 2 by means of the aforesaid ball joint 8", which ball joint may be replaced by an equivalent articulated member. At an intermediate portion thereof, the arm 7 is supported onto the frame 2 through a movable hinge assembly 114 including a bracket 115, welded at 116 to the arm 7, a hinge 117 to which a supporting bar 118 is connected, said supporting bar being of arcuate shape and slidingly received into a tubular member 119, this latter being fixed, e.g., by welding at 120 and 121 to the frame 2 of the apparatus.

The bar 118 and the tubular member 119 have a curvature radius $R_1$ with center at the ball joint 8". In this preferred embodiment the members 118 and 119 are both tubular and of substantially circular or square crossection (see FIG. 8 section). As shown in FIG. 5 also on the other side or face of the frame 2 connecting members identical to the just described members are located. As it will be apparent the function of this movable hinge assembly is to support and guide the movable arm 7 preventing it from excessively disaligning as otherwise would occur due to its connection through the ball joint 8". At the other of its ends the movable arm is connected to the two cylinder-and-piston assemblies 8'''' by means of an anchoring assembly of Cardanic or universal joint type indicated generally by the reference number 122. The Cardanic assembly 122 connects the stem 123' of the cylinder-and-piston assembly 8''' with the movable arm 7. The connection with said movable arm is achieved by ear members 123 associated to the movable arm. At the other end the cylinder-and-piston assembly 8''' connects to the frame 2 by a Cardanic joint 124 comprising ears 125 and connecting pins 126 and 126'. Of course, also the other cylinder 8''' on the other side of the apparatus 1 is connected to the arm 7 by means of a like Cardanic assembly 122, the other end of this cylinder-and-piston assembly 8''' being articulatedly connected in a likewise manner to the frame 2. From the preceding description it can be noted that the manner in which the movable arm is connected is substantially different from that of the preceding embodiment in which the arm 7 was merely pivoted to the frame 2. Also the connecting arrangement of the groups 8''' to the arm 7 and to the frame 2 is substantially changed. This new-type and improved connection allows for the arm 7 to carry out, as it is brought into contact with the trunk, "settling" or selfadjusting movements, thereby the stresses onto the arm 7 are almost completely avoided as will appear clear later on. Continuing with the description it is to be noted that the ball joint 8", the hinge 117 and the pin P of the anchoring Cardanic assembly 122 are substantially aligned with a rotation axis An which is coincident with the hinge 117 and extends, parallel to the axes of the two pins P between the two upper and lower Cardanic assemblies 122, these three axes lying in the same plane, this being an important and fundamental characteristic. The axis An intersects the roller 111 at a point C' which is shifted inwardly, with respect to the two jaws, from the center C of the roller 111 by a predetermined distance H. This is an important characteristic of this embodiment in that, as it will be now described, it allows to obtain, when the arm 7 is closed, a self centering couple onto the tree trunk. Referring now to FIG. 10 it will be noted that, when the movable arm 7 is tightened to the trunk of the tree by the cylinder-and-piston groups or assemblies 8''', i.e. when said arm is brought to the position indicated by the dashed line, a lever arm h originates which in turn generates the aforesaid self-centering and self-tightening couple onto the trunk of the tree. Therefore the arm 7 will catch the tree always in the best way, independently from the configuration or irregularities of the tree, automatically shrinking and self-tightening onto the tree through the action of the piston and cylinder members, the arm movements being assured by the ball joint 8", the hinge assembly 114, Cardanic assembly 122 and articulated joint 124.

Tests have shown that the connecting and catching system of this invention is perfectly efficient. Also the mounting of the arm 7 on the frame 2 during the construction of the apparatus is extremely simple. It is important, however, to take care to align with an auxiliary "musk" or pattern the ball joint 8", the hinge 117 and the pivot 115 of the universal joint 22 according to a pre-established angle with respect to a horizontal line passing through the center of the ball joint 8", all of them lying in the same plane.

Referring now to FIGS. 11–16, there is schematically shown a portion of another embodiment of the apparatus for automtically harvesting fruit according to the present invention, i.e. the portion of the jaw members with their associated catching members. Referring therefore to the aforesaid FIGS. 11-13, the catching portion of the apparatus comprises a first jaw unit 6' rigid with the frame (not shown) of the apparatus and a second jaw unit 7' swingable from an opening position to a closing and/or catching position with respect to the first jaw unit 6'. The jaw unit 7' is removably associated to the frame by means of an articulated or ball joint (not shown), of the previously described kind, which allows the jaw unit 7' to carry out movements in substantially any directions. The opening and closing movements of the jaw unit 7' are obtained by means of two hydraulic cylinder-and-piston members (not shown), which, as described, are substantially opposingly located, one on the horizontal upper side and the other on the horizontal lower side of said frame. The vibrations are generated by hydraulic motors suitably located (not shown). To the jaws 6" and 7" respectively, resiliently deformable catching members or pads 10', 11' are removably secured, which are characteristic of this embodiment and made, for example, of a material having such an elasticity to allow the pads 10', 11' to deform when the jaw 7" is closed to tighten against the trunk of a tree. As shown, the pad 10' is removably associated to its jaw 6" by plates 12', 12", which plates may be easily removed to allow for the fitting of the resiliently deformable catching member 10' to trunks of different diameters. The catching members 10', 11', which in FIG. 11 are shown in abutting relationship, are not, in this embodiment, roller members but they are members which are provided with respective trunk contacting flat surfaces. The flat contacting surface of the member 11' is provided by the skirt 13" shown in FIG. 13. This characteristic is of basic importance in that it always assures the best catching of the trunk of the tree. Moreover, this being an important aspect of this embodiment, the resiliently deformable catching member 11' is associated to its jaw 7" not in a fixed manner but swingably, as it is clearly shown in FIGS. 11 and 13. More specifically, to the jaw 7" a supporting member 14" is fixedly associated, e.g. by welding as is particularly shown in FIG. 14D. The supporting member 14" includes an upper bracket member 15" of substantially triangular shape and a lower bracket member 16" (FIG. 4D) also of substantially triangular shape. The member 15" and 16" are rigid with a plate 17" extending substantially over the full width of the jaw 7". To the 15", 16", 17" assembly a semitubular member 18" is associated extending also over the full width of the jaw 7", the outer semicylindrical surface of said member 18" facing towards the inner side of the jaw. Another semitubular member 19" (see FIG. 13) is adapted to engage rotatably and slidably said semitubular member 18". The semitubular member 19" is rigid with a frame 20" of substantially V-shape and provided with reinforcing ribs 21". The frame 20" supports the body of the resiliently deformable catching member 11". More specifically, as shown in FIG. 13, at the end of the two arms of the frame 20" respective section members 22" of rubber are located (see FIG. 15) which act to hold in a spaced relationship the rubber skirt which forms the flat portion 13". In the space between the frame 20", and the skirt 13" being inserted, as it is conventional, an inert granulated material 23" adapted to allow the catching member to be pressed in a resiliently deformable manner against the trunk of the tree.

Still with reference to FIGS. 12 and 13, to prevent the slipping out of the swingable catching member 11', fixing means have been provided, said means consisting for example of two rods 24" and 25". Rods 24", 25" are provided with holes adapted to receive corresponding bolts for the fixing at predetermined points $P_1$ and $P_2$ on the jaw 7" and at predetermined points of the body of the swingable catching member 11'. It is to be noted that, in operation, negligible stresses act on the rods 24", 25" owing to the possibility of rotation of the catching member 11'.

Referring now to FIGS. 14A–D, a preferred manner for carrying out the swingable catching member 11' will be described. For making said member 11' it is firstly provided a sheet portion 26" for example of rubber. In the sheet portion 26", having the desired thickness, a plurality of holes 27" and four cuts 28" are provided, for example at the indicated positions. Successively, by simply folding out from the flat configuration the box-like configuration of FIG. 4B is obtained. The box-like member thus formed is then associated to the assembly shown in FIG. 14C and the holes 27" are engaged with corresponding stud members 27'" provided in the assembly shown in FIG. 14C. As it can be noted, the spacer section members 22", for example of rubber, have already been located. To fit the box-like member suitable interposing strips 29" are provided. Once the box-like member has been fitted to the assembly of FIG. 14C, the thus formed space will be filled by the aforesaid inert granulated material 23", through one unfolded side of the skirt member 13. Successively, the side from which said inert granulated material has been introduced will be closed for example by bolts. In this manner a pad assembly is obtained having a flat surface 13" which is able to provide a quite good catching of the trunk. This pad assembly will be mounted on the supporting assembly of FIG. 14D which is integral with the movable jaw 7", the interengaging being such that the semitubular member 19" abuts the semitubular member 18", said members thus forming a connection of hinge type. The mounting of the other not-swingable catching member 10' may be carried out in a manner similar to that described for the swingable catching member 11'.

Figure 16:
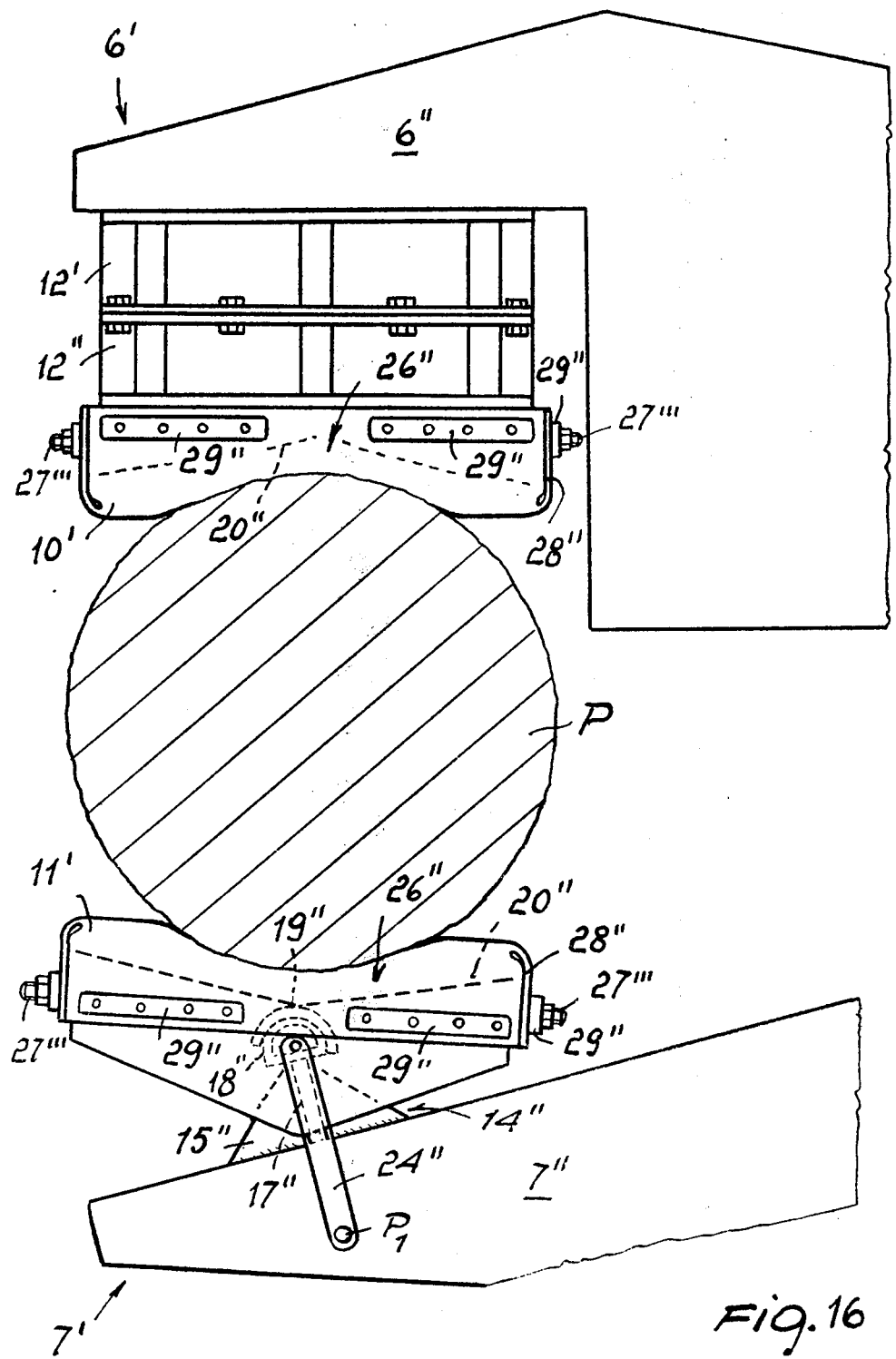
FIG. 16 is a schematic perspective view showing the jaw members of the apparatus for automatically harvesting fruit engaging by means of their associated catching members a tree for the shaking thereof.

Referring finally to FIG. 16, the jaws 6" and 7" of the harvesting apparatus are shown in their operative position, with the catching members 11' and 10' thereof tightened onto a tree P. As shown, the tree contacting surface is large and moreover the fitting of the two catching members is quite good owing to the possibility of settling or selfadjusting of the swingable catching member 11' onto the trunk of the tree P. It is to be noted that in FIG. 16 the catching members 10', 11' have been shown with their "deformed" configuration, which deformation of course will cease when the jaws will be separated, because, as aforesaid, said deformation is of elastic type. Of course, the inert material within the two catching members 10', 11' assures a "non yieldable" and safe catching.

From the foregoing description the operation of the single component parts of the described device will be evident.

In general, the device operates as follows:

After having ascertained that the weight of the eccentric masses 20 and 21 is suitable for the size of the selected tree trunk, the apparatus is brought by the tractor 4' in front of the tree to be shaken and is so positioned that the selected portion of the tree trunk is situated between the jaws of the apparatus, the apparatus being suspended on the carrying chains of the tractor. The hydraulic jacks 8' or 8''' are then actuated to close the jaws and clamp the tree trunk. During this action the supporting chains may be gradually slackened and the jaws may adjust themselves in the previously described manner on the tree trunk and remain clamped thereon. In certain circumstances the chain supporting action may be completely omitted, after the tree has been clamped. Then the hydraulic motors 9 and 9' are actuated through the hydraulic circuit and are caused to rotate the eccentric masses 20 and 21 with selected speeds. The speeds of rotation of the two motors may be gradually changed both in intensity and direction during operation independently from each other so that the eccentric masses may rotate with variable angular velocity within a wide range, thus causing variable vibrations during operation. Owing to the fact that the angular speed of one eccentric mass is differently variable with respect to the angular speed of the other mass, the direction of the resulting vibration forces is varied. It has been found that the variation of the direction of the vibration forces at predetermined periods of the shaking action is of great efficiency for obtaining a rapid detachment of the fruit from the branch. Since the apparatus is supported on the tree and has no other rigid point of support, it vibrates together with the tree trunk, so that no dangerous reaction forces may be provoked, as would be the case if the apparatus would have been supported on a rigid outside support. When the shaking action is terminated and the fruits harvested the hydraulic jacks of the jaws are deenergized, the crane of the tractor actuated to tighten the supporting chains, the clamping action of the jaws released and the apparatus brought away by the tractor.

While the invention has been described referring to preferred embodiment thereof, it is not limited by these embodiments and those skilled in the art may carry out all changes and modifications falling within the true spirit and scope of the invention as defined in the appended claims.

I claim:

1. A tree shaking apparatus for automatically harvesting fruit including a frame, clamping jaws on said frame, eccentric mass assemblies rotatably mounted on said frame and driving means for imparting rotation to said eccentric mass assemblies, characterized in that it comprises at least one first rotating mass assembly rotatably mounted on said frame, first motor means supported on said frame, first transmission means in said frame for transmitting variable rotatory motor from said first motor means to said first eccentric mass assembly, at least a second eccentric mass assembly rotatably mounted on said frame independently from said first eccentric mass, a second motor means supported on said frame and second transmission means in said frame for transmitting variable rotatory motion from said second motor means to said second eccentric mass assembly independently from the rotation of said first eccentric mass and selectively variable both in direction and intensity.

2. An apparatus according to claim 1, characterized in that said first and second eccentric mass assemblies comprise a common shaft mounted on said frame and idly mounted on said common shaft a first and a second driven pulleys rotatorily independent from each other, said first and second driven pulleys having mass blocks removably secured thereto in eccentric position with respect to the axis of rotation of the driven pulleys, each of said first and second motor means including a respective first and second driving pulley connected thereto and wherein said first and second transmission means comprise respective first and second belt connection means transmissively connecting the respective driving and driven pulleys.

3. An apparatus according to claim 1, characterized in that said frame has a generally parallelepiped shaped and normally horizontal opposite sides thereof and wherein said first and second motor means are mounted on said normally horizontal opposite sides and having their axes of rotation perpendicular to said normally horizontal sides.

4. An apparatus according to claim 1, comprising a first jaw member rigid with said frame and a second jaw member swingably mounted on said frame, characterized in that it includes first and second hydraulic cylinder-and-piston means adapted to swing said second jaw member with respect to said first jaw member from a closing and catching position to an opening position, and in that said first and second hydraulic means are located at substantially opposed positions onto normally horizontal upper and lower sides of said frame and substantially perpendicularly to a longitudianl axis of said frame.

5. An apparatus according to claim 4, characterized in that said jaw members have each roller like catching members removably fixed thereon.

6. An apparatus according to claim 4, characterized in that said swingably mounted jaw member has an arm and a clamping head on a free end of said arm, a first articulation means with said frame on an end of said arm opposite said clamping head, a second articulation means with said frame in an intermediate position of said arm between said first articulation means and said clamping head and at least one third articulation means on said arm near said clamping head for hingedly connecting said arm with an end of at least one of said hydraulic cylinder-and-piston means.

7. An apparatus according to claim 6, wherein said first articulation means is a ball joint, said second articulation means comprises an arcuated bar the center of curvature of which coincides with the center of said ball joint, an arcuated tubular guide fixed on said frame coextensive with at least a portion of said arcuated bar slidably inserted therein, a hinge means on an end of said arcuated bar facing said arm and hingedly connecting said arcuated bar with said jaw arm, an axis of rotation of said hinge means intersecting the center of said ball joint, wherein said third articulation means comprise a first Cardan joint having a first axis of rotation intersecting said ball joint and a second axis of rotation, directed transverse thereto and wherein said hydraulic cylinder-and-piston means have on another end thereof a second Cardan joint connecting it to said frame.

8. An apparatus according to claim 7, wherein said jaw arm has a clamping head on an end thereof opposite to said ball joint, said clamping head having a roller-like catching member having a substantially cylindrical shape defining a centerline, said centerline of said roller-like catching member being arranged in an offset position with respect to said first axis of rotation of said first Cardan joint.

9. An apparatus according to claim 1, characterized in that at least one of said clamping jaws has a resiliently deformable catching member swingably connected thereto said catching member having a respective substantially flat catching member having a respective substantially flat catching surface.

10. An apparatus according to claim 9, characterized in that said swingable catching member comprises a substantially V-shaped frame, a skirt member of resilient sheet material covering said V-like frame member and defining an interspace therebetween, a filling material arranged in said interspace, a hinge mechanism connecting said swingable catching member with said clamping jaw, said hinge mechanism comprising cooperating semitubular members between said catching member and said jaw and locking means preventing mutual disengagement of said cooperating semitubular members.

* * * * *